Nov. 12, 1929.                    A. FINN                    1,735,743
                        SAFETY DEVICE FOR AUTOMOBILES
                    Filed Oct. 6, 1928        3 Sheets-Sheet 1

Abraham Finn,
INVENTOR:

BY Victor J. Evans,
ATTORNEY.

WITNESS

Nov. 12, 1929.　　　　A. FINN　　　　1,735,743
SAFETY DEVICE FOR AUTOMOBILES
Filed Oct. 6, 1928　　　3 Sheets-Sheet 2

Nov. 12, 1929.       A. FINN       1,735,743
SAFETY DEVICE FOR AUTOMOBILES
Filed Oct. 6, 1928       3 Sheets-Sheet 3

Abraham Finn,
INVENTOR.

BY Victor J. Evans,
ATTORNEY.

Patented Nov. 12, 1929

1,735,743

UNITED STATES PATENT OFFICE

ABRAHAM FINN, OF ELIZABETH, NEW JERSEY

SAFETY DEVICE FOR AUTOMOBILES

Application filed October 6, 1928. Serial No. 310,848.

This invention relates to improvements in safety apparatus for automobiles and is identical with the invention disclosed in my application filed March 11th, 1927, Serial Number 174,583 which was held forfeited.

The primary object of the invention resides in the provision of a safety device for preventing an automobile from overturning when accidentally colliding with another vehicle or object to prevent injury to the occupants thereof and damage to the automobile. It will be appreciated that the seriousness of many automobile accidents is caused by the upsetting of the automobile after a collision, whereas if the same remained in an upright position, much damage and injury may be prevented.

Another object of the invention is the provision of a safety apparatus which is normally locked against operation but which is rendered automatically operable when the bumper of the vehicle comes in contact with another object.

A further object is to provide a safety apparatus which is automatically operable and which simultaneously operates the brakes of an automobile to bring the same to a quick stop.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 5 is a collective perspective view of several of the parts of my safety apparatus.

Figure 1:
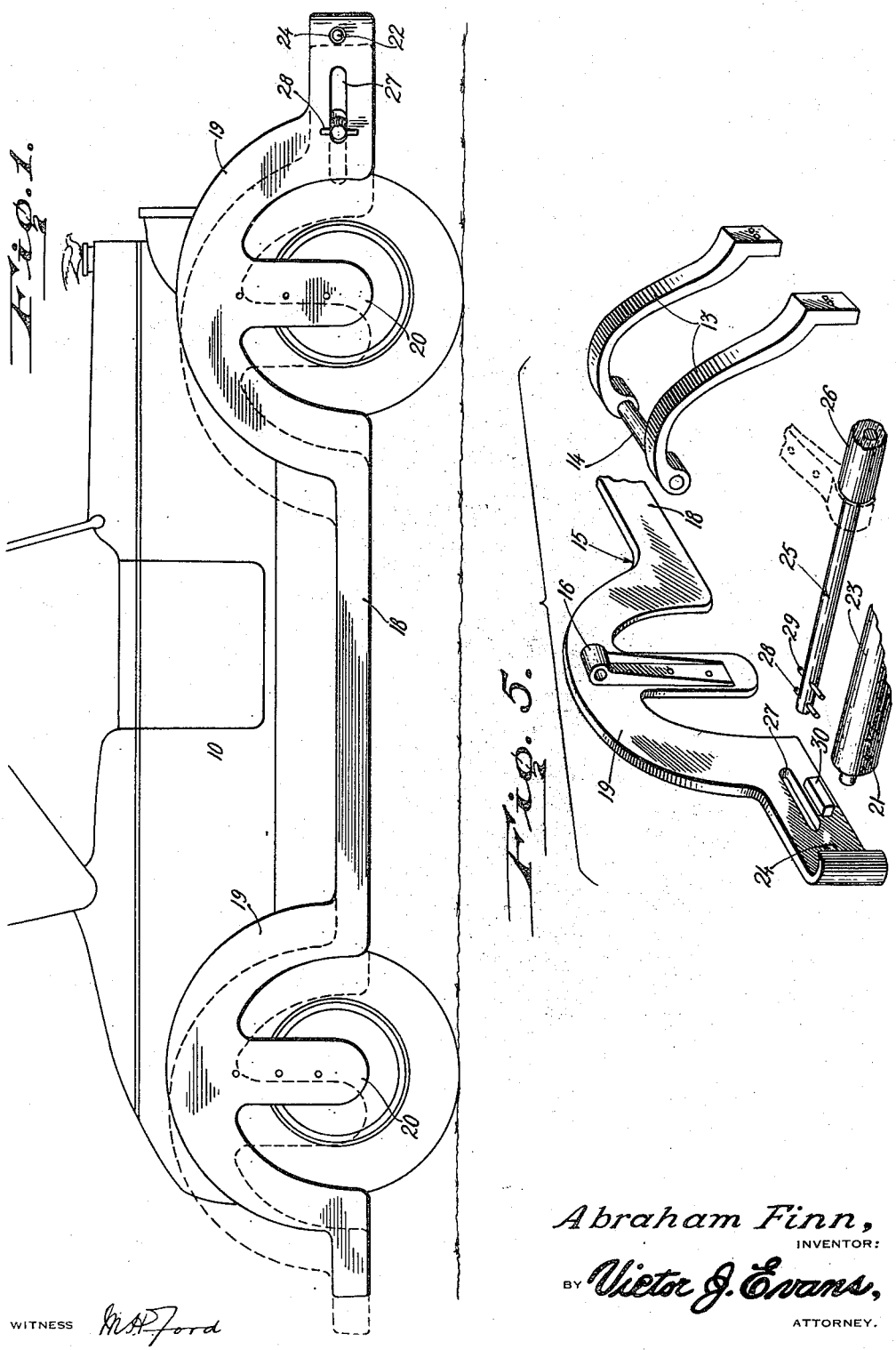
Figure 1 is a side elevation of my improved safety device applied to an automobile and showing in dotted lines, the position of the parts after the mechanism has been moved to an operative position.

Referring more particularly to the drawings, the reference numeral 10 designates an automobile which includes a chassis 11 and a brake mechanism 12. Extending from opposite sides of the chassis 11 are sets of brackets 13, each set of which supports a horizontal rail 14 which extends parallel to the length of the chassis. The rail support members 15, each of which is provided with ears 16 on the inside thereof for receiving the rails whereby the members are slidably mounted for longitudinal movement and for outward swinging movement with respect to the chassis. Guide rails 17 extend from the chassis for preventing inward swinging movement of the members 15 beyond a vertical position and assist the members during their sliding movements. The members 15 are of a shape to provide a straight portion 18 adapted to lie parallel with the running board of the automobile and semi-circular portions 19 for exposing the wheels of a vehicle. Legs 20 extend downwardly from the curved portions 19 to a plane even with the portion 18.

The front ends of the members 15 are curved inwardly and support a removable captive bumper 21 which comprises a rod 22 covered with a rubber or yieldable material 23. The covering of material terminates short of the ends of the rod to permit the ends to be seated in openings 24 provided in the front ends of the members 15. Rotatably supported by the front ends of the chassis is a trip rod 25 having a covering of yieldable material 26 thereon and disposed intermediate the side rails of the chassis so as to relieve any shock when the bumper 21 contacts therewith. The ends of the rod 25 extend through slots 27 provided in the front of the members 15 and are normally disposed at the rear end of the slots as shown in Figure 1 of the drawings in order to permit the members to be moved in a rearward direction. The outer and inner sets of pins 28 and 29 are respectively provided on the ends of the rod 25 and between which pins, the members 15 are disposed. The pins are normally disposed in a vertical position to lock the members 15 against outward swinging movement but are adapted to be moved to a horizontal position upon the rearward shifting of the members 15 by reason of the cams 30 carried by the inner sides of said members and disposed in the path of the lower pins 20. Chains 31 connect the bumper 24 with the rod 25 for preventing the bumper from dropping free of the automobile after the members 15 swing to an outward or operative position.

Figure 4:
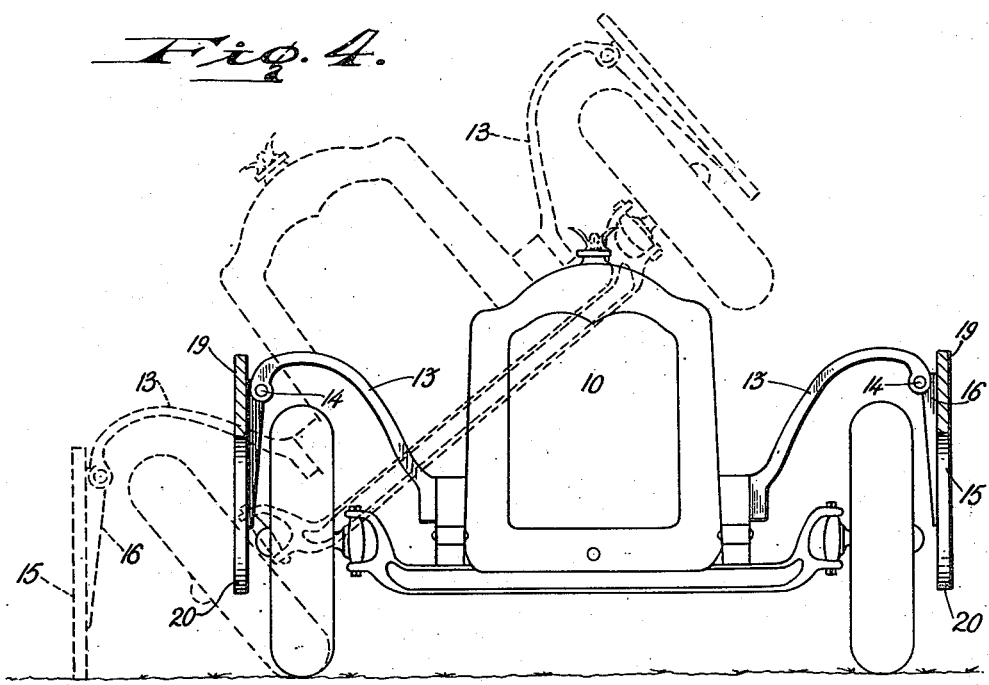
Figure 4 is a vertical transverse sectional view through the safety apparatus and showing in dotted lines the position of the parts after the automobile has been struck.

In operation, should an automobile equipped with my improved safety device collide with another vehicle or with a stationary object and the force of the blow should be directed to the outer end of the bumper 21 or to the bumper intermediate its ends, the said bumper will of course move backward to a position against the cushion 26, and in so moving the members 15 are shifted backward on the rails 14 to a position shown by the dotted lines in Figure 1 of the drawings. As the members 15 move backward, the cams 30 strike the pins 29 causing a one-quarter revolution of the rod 25 to bring the pins into alignment with the slots 27. Should the vehicle begin to turn or tilt over on either of its sides, the member 15 on the side to which it tips will automatically swing outward to the position shown in dotted lines in Figure 4 of the drawings. The bumper 21 will drop to the ground as the outward swinging movement of the members releases the same, but the chains 31 prevent separation of the bumper from the automobile proper. When in the position shown in Figure 4, the member 15 serves as a leg or support for preventing the further upsetting of the vehicle. The portions 18, 19 and 20 of the members 15 further prevent damage to the body and wheels of an automobile should the same be struck on the side by any vehicle.

Figure 2:
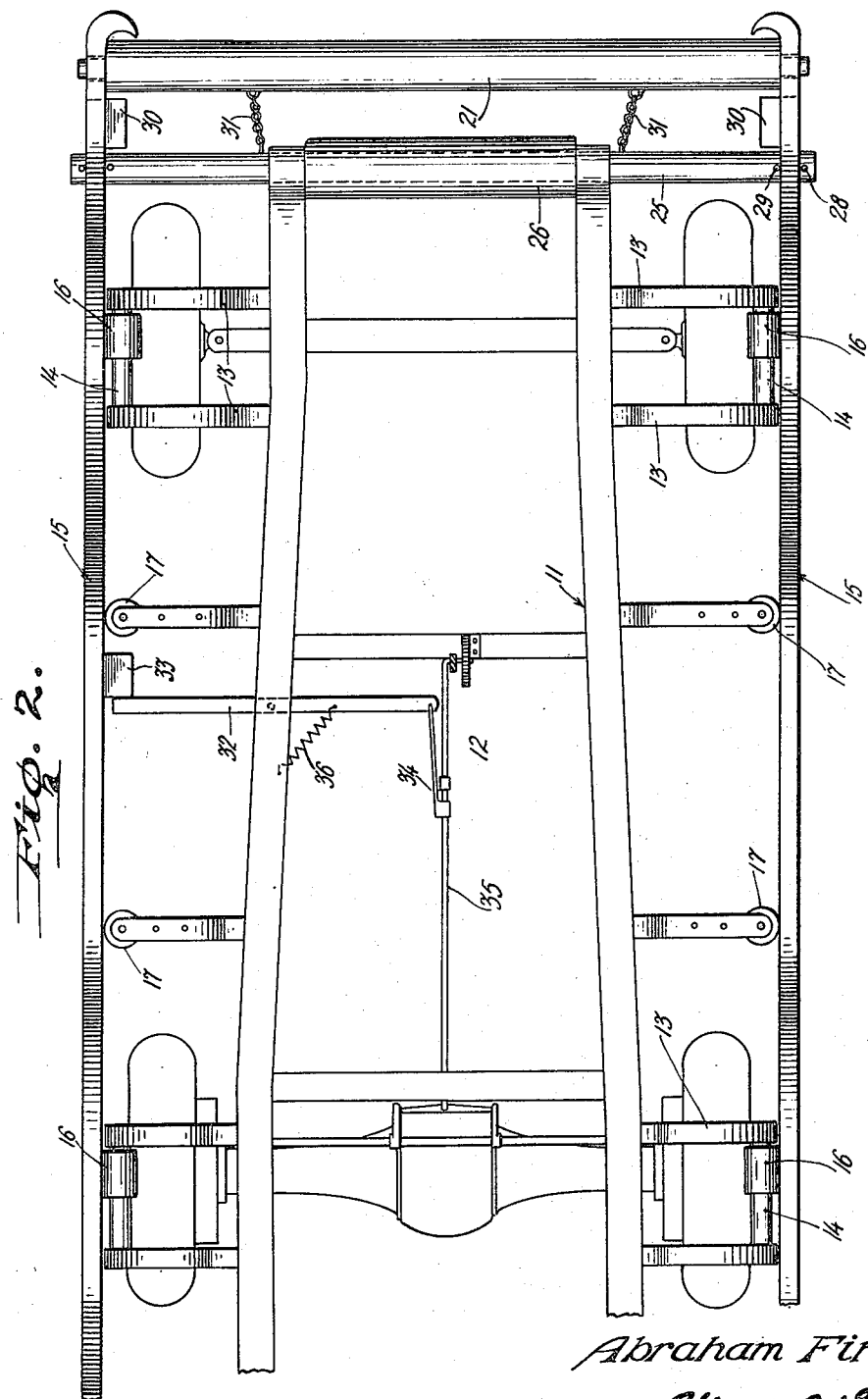
Figure 2 is a top plan view of the chassis of an automobile with my safety device thereon.
Figure 3:
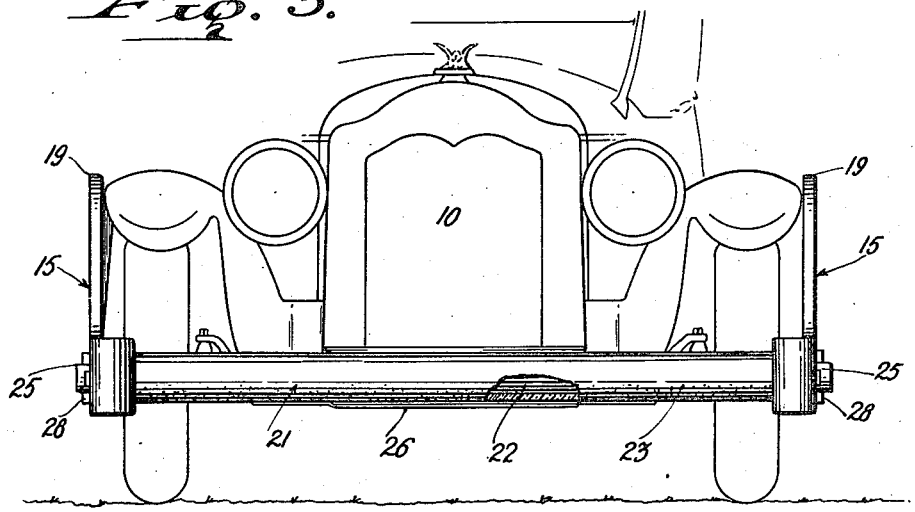
Figure 3 is a front elevation.

Pivoted on the chassis frame 11 is a lever 32, one end of which extends in the path of movement of a lug 33 provided on the inside of one of the members 15. The other end of the lever is connected by a cable 34 with the brake actuating cable 35 of the brake mechanism 12. As the member 15 moves backward, the lug 33 strikes the outer end of the lever and swings the same about its pivot so that the inner end of the lever will exert a pull upon the cable 34 thus actuating the brake mechanism 12 to automatically apply the brakes of the vehicle in the event that the operator fails to do so. A contractile spring 36 has one end connected to the inner end of the lever 32 and its other end to the chassis for normally holding the lever in a position shown in Figure 2 of the drawing.

After the safety device has been actuated, the parts may be moved back to normal position by the shifting of the members 15 forward and by turning the rod 25 to its original position and replacing the bumper 21 in the openings 24 provided therefor.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What is claimed as new is:—

1. In an automobile having a bumper mounted forward thereof, and means operable by gravity for preventing the tipping over of said automobile, said means being released upon the accidental colliding of the bumper with an object.

2. In an automobile having a bumper mounted at one end thereof, a pair of members swingingly mounted on opposite sides of the automobile and extending approximately the length thereof, means for holding said members against swinging movement, and means operable by said bumper for actuating said first means for permitting the free swinging movement of the same should said bumper come in contact with an object, substantially as and for the purpose specified.

3. In combination with the chassis of an automobile, a rod turnably mounted at one end thereof, a pair of members swingingly mounted on opposite sides of said chassis and movable longitudinally with respect thereto, coacting means between said rod and said members for preventing outward swinging movement of said members, a bumper removably supported by said members forward of said rod, and means for releasing said coacting means upon backward movement of said bumper to free said members to allow the same to swing outward upon the lateral tilting of said chassis in either direction.

4. In combination with the chassis of an automobile, a rod turnably mounted at one end thereof, a pair of guard members swingingly mounted on opposite sides of said chassis and movable longitudinally with respect thereto, said guard members having diametrically opposed slots therein for the reception of the ends of said rod, pins carried by the ends of said rod for preventing the outward swinging of said guard members, a captive bumper removably supported by said guard members forward of said rod, and means for imparting a partial rotation of said shaft to align said pins with said slots upon the backward movement of said bumper and said guard members to free said guard members to allow the same to swing outward upon the lateral tilting of said chassis in either direction.

5. In combination with an automobile having brake mechanism, of a pair of guard members swingingly mounted on opposite sides thereof and slidable with respect thereto, a bumper removably mounted on the front of said guard members, means for normally preventing the outward swinging of said members, means operable upon the rearward movement of said bumper and said guard members for releasing said first means to free said guard members therefrom, and means operable by the rearward sliding movement of said guard members for actuating said brake mechanism.

6. In combination with an automobile having brake mechanism, of a pair of guard members swingingly mounted on opposite sides thereof and slidable with respect thereto, a bumper removably mounted on the front of said guard members, means for normally preventing the outward swinging of said members, means operable upon the rearward movement of said bumper and said guard members for releasing said first means to free said guard members therefrom, and means operable by the rearward sliding movement of said guard members for actuating said brake mechanism, said last means including a pivoted lever, one end of which is normally disposed in the path of a lug carried by one of said guard members, while the other of said lever is connected with the cable of said brake mechanism.

7. In combination with the chassis of an automobile, a rod journalled in the front thereof, aligned rails supported outwardly from opposite sides of said chassis, guard members respectively mounted on said rails to lie parallel with respect to the sides of said chassis for sliding and swinging movement thereon, a bumper removably carried by the front ends of said guard members and normally spanning the space therebetween, said guard members having opposed slots provided therein for the reception of the ends of said rod, pins on the ends of said rods for normally preventing the outward swinging movements of said guard members, and coacting means between said guard members and said rod for imparting a partial rotation of said rod to cause said pins to align with said slots upon the rearward sliding movement of said guard members.

In testimony whereof I have affixed my signature.

ABRAHAM FINN.